US006630974B2

(12) United States Patent
Galabova et al.

(10) Patent No.: US 6,630,974 B2
(45) Date of Patent: *Oct. 7, 2003

(54) SUPER-WIDE-ANGLE CHOLESTERIC LIQUID CRYSTAL BASED REFLECTIVE BROADBAND POLARIZING FILMS

(75) Inventors: Hristina Galabova, Mamaroneck, NY (US); Le Li, Yorktown Heights, NY (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/312,164

(22) Filed: May 14, 1999

(65) Prior Publication Data

US 2001/0003473 A1 Jun. 14, 2001

Related U.S. Application Data

(63) Continuation-in-part of application No. 09/287,579, filed on Apr. 6, 1999, and a continuation-in-part of application No. 09/032,302, filed on Feb. 27, 1998, and a continuation-in-part of application No. 08/890,320, filed on Jul. 9, 1997, and a continuation-in-part of application No. 08/805,603, filed on Feb. 26, 1997, now Pat. No. 5,940,150, and a continuation-in-part of application No. 08/787,282, filed on Jan. 24, 1997, now Pat. No. 6,338,807, and a continuation-in-part of application No. 08/743,293, filed on Nov. 4, 1996, now Pat. No. 6,133,980, and a continuation-in-part of application No. 08/739,467, filed on Oct. 29, 1996, now Pat. No. 6,034,753, and a continuation-in-part of application No. 08/715,314, filed on Sep. 16, 1996, now Pat. No. 6,188,460, and a continuation-in-part of application No. 08/550,022, filed on Oct. 30, 1995, now Pat. No. 5,691,789.

(51) Int. Cl.$^7$ .............................................. G02F 1/1335
(52) U.S. Cl. .................... 349/119; 349/96; 349/115

(58) Field of Search ................................ 349/74, 75, 96, 349/115, 117, 119

(56) References Cited

U.S. PATENT DOCUMENTS

| 3,711,181 A | * | 1/1973 | Adams, Jr. et al. .......... 350/157 |
| 5,364,557 A | * | 11/1994 | Faris ...................... 252/299.01 |
| 5,506,704 A | * | 4/1996 | Broer et al. ................... 359/63 |
| 5,599,412 A | * | 2/1997 | Faris ........................... 256/73.3 |
| 5,691,789 A | * | 11/1997 | Li et al. ......................... 349/98 |
| 5,695,682 A | * | 12/1997 | Doane et al. ........... 252/299.01 |
| 5,940,150 A | * | 8/1999 | Faris et al. ..................... 349/16 |
| 6,099,758 A | * | 8/2000 | Verrall et al. ................ 252/585 |
| 6,300,929 B1 | * | 10/2001 | Hisatake et al. ............... 345/94 |

FOREIGN PATENT DOCUMENTS

| EP | 0860716 | * | 8/1998 |
| EP | 0860717 | * | 8/1998 |

* cited by examiner

Primary Examiner—William L. Sikes
Assistant Examiner—Dung Nguyen
(74) Attorney, Agent, or Firm—Richard L. Sampson; Ralph J. Crispino

(57) ABSTRACT

Cholesteric liquid crystal films using varying pitch helix structures aligned perpendicular to the surface of the film for broadband reflection and transmission of circularly polarized light distort the light at large viewing angles of incidence due to the elliptical cross section of the CLC helix with the light at large incident angles. By using compensating films of an infrared cholesteric liquid crystal to rotate the major axis of the elliptical light to ±45 degrees and a homeotropic film having elongated molecules with the long axis perpendicular to the surface of the film to convert the elliptically adjusted light from the IR CLC film to circularly polarized light, the distortions at large angles can be eliminated. The compensated light will be circularly polarized for large angles of incidence over a broad band.

15 Claims, 12 Drawing Sheets

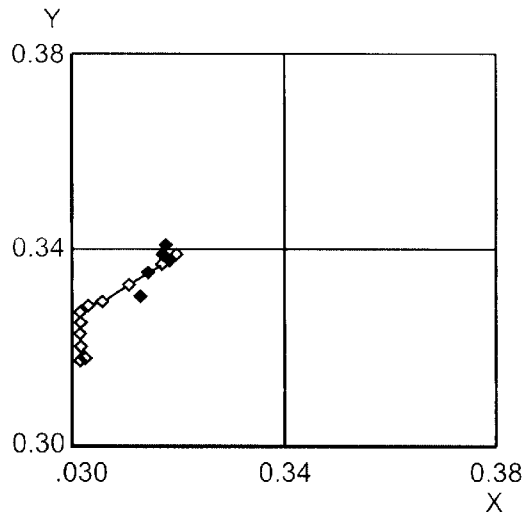
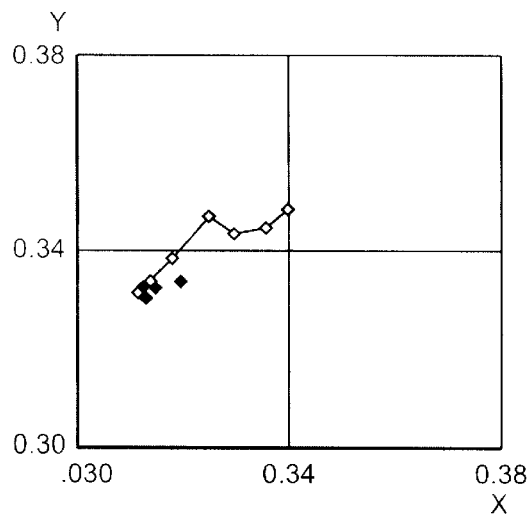
Fig. 14C
Fig. 14D
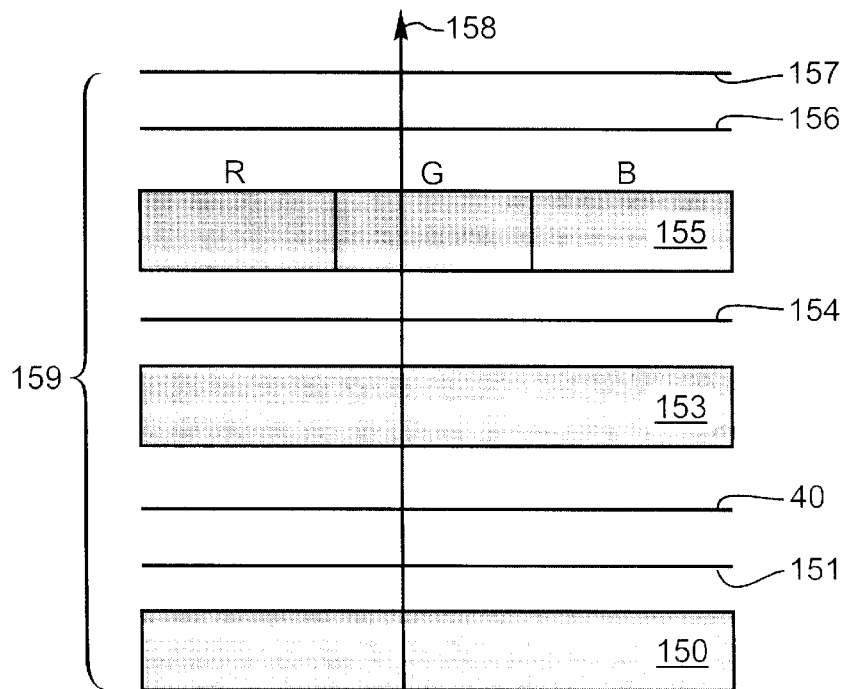
Fig. 15

SUPER-WIDE-ANGLE CHOLESTERIC LIQUID CRYSTAL BASED REFLECTIVE BROADBAND POLARIZING FILMS

RELATED CASES

This is a Continuation-in-Part of U.S. application Ser. No. 09/287,579 filed Apr. 6, 1999; U.S. application Ser. No. 09/032,302 filed Feb. 27, 1998; U.S. application Ser. No. 08/890,320 filed Jul. 9, 1997; U.S. application Ser. No. 08/805,603 filed Feb. 26, 1997, entitled "Electro-Optical Glazing Structures having Total-Reflection and Transparent Modes of Operation for use in Dynamical Control of Electromagnetic Radiation" by Sadeg Fans and Le Li, now U.S. Pat. No. 5,940,150; U.S. application Ser. No. 08/787,282 entitled "Cholesteric Liquid Crystal Inks" by Sadeg Faris, filed Jan. 24, 1997, now U.S. Pat. No. 6,338,807; U.S. application Ser. No. 08/743,293 entitled "Liquid Crystal Film Structures with Phase-Retardation Surface Regions Formed Therein and Methods of Fabricating the Same" by Sadeg Farms filed Nov. 4, 1996, now U.S. Pat. No. 6,133,980; U.S. application Ser. No. 08/739,467 entitled "Circularly Polarizing Reflective Material Having Super Broad-Band Reflecting and Transmission Characteristics and Method of Fabricating and Using Same in Diverse Applications", by Le Li and Sadeg Faris filed Oct. 29, 1996, now U.S. Pat. No. 6,034,753; U.S. application Ser. No. 08/715,314 entitled "Image Display Panel having a Back-lighting Structure and a Single-Layer Pixelated Array of Reflective-Type Spectral Filtering Elements where between Light is Recycled for Producing Color Images with Enhanced Brightness" by Sadeg Faris filed Sep. 16, 1996, now U.S. Pat. No. 6,188,460; U.S. Application No. 08/550,022 entitled "Single Layer Reflective Super Broadband Circular Polarizer and Method of Fabrication Therefor" by Le Li and Sadeg Faris filed Oct. 30, 1995, now U.S. Pat. No. 5,691,789; each said application being assigned to Reveo, Inc. and incorporated herein by reference in its entirety.

BACKGROUND OF THE INVENTION

1. Field of the Invention

This invention relates to polarizing broad bands of light and particularly to polarizing broad bands of light at large angles of incidence from any azimuth without polarization or color distortion in both transmission and reflection modes.

2. Description of the Related Art

Cholesteric Liquid Crystals (CLC) have the property of being able to reflect or transmit circularly polarized light depending on the handedness of the light, reflecting one circular polarization and transmitting the opposite circular polarization. For example, a right handed cholesteric liquid crystal will reflect right handed circularly polarized light and transmit left handed circularly polarized light. Cholesteric liquid crystals can be made which function over a large bandwidth such that all the colors in the spectrum can be reflected or transmitted. These properties are very useful in many applications and work well when the incident light is normal to the cholesteric liquid crystal films. However, polarization and spectral distortions occur at large angles of incidence and vary at different viewing angles due to the eigen-states of the light being elliptical rather than circular. These distortions reduce the polarizer efficiency and produce color shifts. Many attempts to correct these polarization and color distortions have been made in the past.

For example in U.S. Pat. No. 5,731,886 entitled "Birefringent Compensator for Reflective Polarizers", Taber et al. issued Mar. 24, 1998 the invention comprises a CLC material layer and a compensator comprising a positively birefringent C-plate layer which is a uniaxial film with an optical axis perpendicular to the surfaces of the film. The compensation film is inserted on the path of the light transmitted through the CLC polarizer, and incorporated into a brightness enhancement system for a liquid crystal display.

The simulation results presented in the patent indicate an improvement in color and luminance behavior of the LCD brightness enhancement system when the C-plate is incorporated into the system. However, no spectra of the CLC polarizers used in these simulations are presented, either with or without an included compensator. The only information about the CLC polarizers is their end-point values of the pitch (0.26 and 0.402 microns) which suggest a reflection band from about 400 nm to 600–650 nm. Improvement in chromaticity behavior of the brightness enhancement system does not necessarily indicate that the CLC polarizer angular behavior has been completely compensated. In addition, the chromaticity of the system is presented for only one azimuthal orientation, and need not be the same at all azimuthal orientations. This compensation technique improves the polar angular behavior of the chromaticity at one azimuthal orientation only. European Patent Application EP 0860717 A2 published Aug. 26, 1998 entitled "Broadband Cholesteric Optical Device, Polarizer, Filter, Liquid Crystal Device, and Polarizing Beam-Splitter", proposes to improve the viewing angle behavior of the broadband CLC-based polarizers by using compensation films, which are uniaxial and have their optical axes perpendicular to the surfaces. The compensation films typically consist of two layers. The layer closest to the CLC polarizer has a positive birefringence, and the second layer has a negative birefringence. These two-layer compensation films may be inserted either in front of the CLC polarizer, or at the back, or both. This compensation technique requires dispersion of the refractive indices of the compensation films. The patent application gives formulas indicating the necessary dispersion relationships.

The CLC polarizer used in the simulations described in the patent has a bandwidth from about 380 nm to 700 nm, and thus would not cover the entire visible range for all incident angles. As the patent indicates, the proposed technique is capable of improving the angular performance of this CLC polarizer up to incident angles of 49 degrees. In order to achieve the proposed compensation, dispersion of the refractive indices of both compensation films is a prerequisite. The authors have derived formulas to specify the required dispersion behavior. These requirements may be quite difficult to satisfy in practice.

Impractical material requirements, however, are not the major drawback of this compensation method. The CLC polarizer spectra presented in the patent indicate that even at normal incidence the polarization state that has to be reflected from the polarizer is actually 20–30% transmitted. When unpolarized light is incident on such a polarizer, saturated reflection will not be achieved, that is, more than 50% of the incident light will be transmitted, and very importantly, the transmitted light will be only partially polarized. This feature will severely degrade the contrast ratio of any system utilizing this CLC reflective polarizer.

A very important aspect of this compensation technique is that it actually would be ineffective if the polarizers were designed so that a saturated reflection did occur for the entire visible range at all incident angles (that is, if the polarizers were thicker, with higher birefringence, and larger bandwidth).

European Patent Application EP 0860716 A2 published Sep. 26, 1998 entitled "Broadband Cholesteric Optical Device, Polarizer, Filter, Liquid Crystal Device, and Polarizing Beam-Splitter" discloses a multi-layer system to serve as a broadband reflective polarizer with improved viewing angle performance. The system consists of alternating narrow-band CLC and homeotropic films with positive birefringence. Broadband reflection is achieved by requiring each CLC layer to have a different peak reflection wavelength. The multi-layer design is to achieve a reflective circular polarizer with superior angular performance. The patent application presents simulation results for a 15-layer system, which is capable of reflecting in the range from 380 nm to 630 nm at normal incidence. The angular behavior of such a polarizer is improved for incident angles of up to 40 degrees.

To produce a reflective circular polarizer with a larger bandwidth and superior angular performance would require the addition of more CLC and homeotropic layers, all having precisely controlled parameters. These requirements make the fabrication of such a system difficult, prone to defects, and expensive.

U.S. Pat. No. 5,808,794 entitled "Reflective Polarizers Having Extended Red Band Edge for Controlled Off-Axis Color", issued Sep. 15, 1998 attempts to solve the angular behavior problem of the broadband polarizers, with a broadband reflective linear polarizer consisting of alternating birefringent and isotropic layers with variable thickness. This linear polarizer does not have polarization distortions at large viewing angles. However, in order to achieve a reflection band covering the entire visible range at all incident angles, it must have at least 800 layers with precisely controlled layer thickness. This complicated structure makes the manufacturing procedure prone to defects and expensive. In addition, the layers have been found to delaminate at extreme environmental conditions, which makes the polarizer inappropriate for military and avionics applications.

SUMMARY OF THE INVENTION

A broadband polarizer and analyzer with two compensation films to compensate the polarization distortions of the light at large angles caused in the polarizer and analyzer layer. The compensation layers bring the light back to circularly polarized light without distortion of chromaticity for all incident angles at all azimuthal orientations.

The broadband polarizer and analyzer is typically a broadband CLC film having a variable pitch helix. Light incident normal to the CLC layer is reflected or transmitted as circularly polarized light with no distortion. Light incident at small angles to normal will have very small distortions. However, light incident at larger angles has more distortions and needs to be corrected for. The first layer of compensation film is a CLC infrared layer to rotate the major axis of the polarization ellipse to ±45 degrees. The second compensation film is a homeotropic layer to convert the light to circular light.

The CLC film with only two compensation layers provides good polarization with no color distortion for incident angles up to about 70 degrees from normal.

The device can be used to analyze light in transmission mode and reflection mode. Similarly, the device can be used to polarize light in transmission mode or reflection mode.

OBJECTS OF THE INVENTION

It is an object of the invention to polarize unpolarized incident light in reflection mode for a large bandwidth and a wide range of incident angles.

It is an object of the invention to polarize unpolarized incident light in transmission mode for a wide range of angles and a large bandwidth.

It is an object of the invention to analyze circularly polarized light for a wide range of angles and a large bandwidth in reflection mode.

It is an object of the invention to analyze circularly polarized incident light in transmission mode for a wide range of angles and a large bandwidth.

It is an object of the invention to transmit broadband polarized light without spectral distortions for a large range of angles.

It is an object of the invention to compensate for the color change associated with using reflective CLC polarizers.

It is an object of the invention to compensate for elliptical distortions of circularly polarized light in cholesteric liquid crystals when incident light is at large angles.

It is an object of the invention to compensate for spectral distortions of circularly polarized light in cholesteric liquid crystals when incident light is at large angles.

It is an object of the invention to compensate for elliptical distortions of circularly polarized light in cholesteric liquid crystals when the light is viewed at large viewing angles.

It is an object of the invention to compensate for color distortions associated with polarization distortions of circularly polarized light in cholesteric liquid crystals when the light is viewed at large viewing angles.

It is an object of the invention to compensate the severe degradation in polarization behavior at large incident angles associated with CLC-based broadband polarizers.

It is an object of the invention to obtain a 45-degree circularly polarizing beam splitter.

It is an object of the invention to provide polarizing beam splitters.

It is an object of the invention to provide high-efficiency passive smart windows.

It is an object of the invention to provide high-efficiency switchable smart windows.

It is an object of the invention to provide polarized light sources with 100% polarization conversion efficiency.

It is an object of the invention to provide polarized beam combiners.

Other objects, advantages and novel features of the present invention will become apparent from the following detailed description of the invention when considered in conjunction with the accompanying drawings.

BRIEF DESCRIPTION OF THE DRAWINGS

For a more complete understanding of the Objects Of The Present Invention, the following Detailed Description Of The Illustrative Embodiments set forth below should be read in conjunction with the accompanying Drawings, wherein:

FIG. 15 is a schematic of a display device incorporating the super-wide-angle CLC-based broadband polarizer.

DETAILED DESCRIPTION OF THE PREFERRED EMBODIMENT

Figure 1:
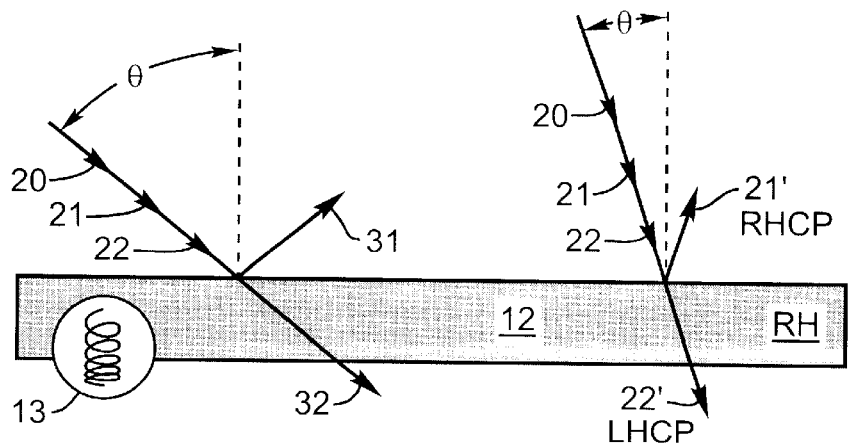
FIG. 1 is a schematic diagram of a CLC-based broadband polarizer.
Figure 2:
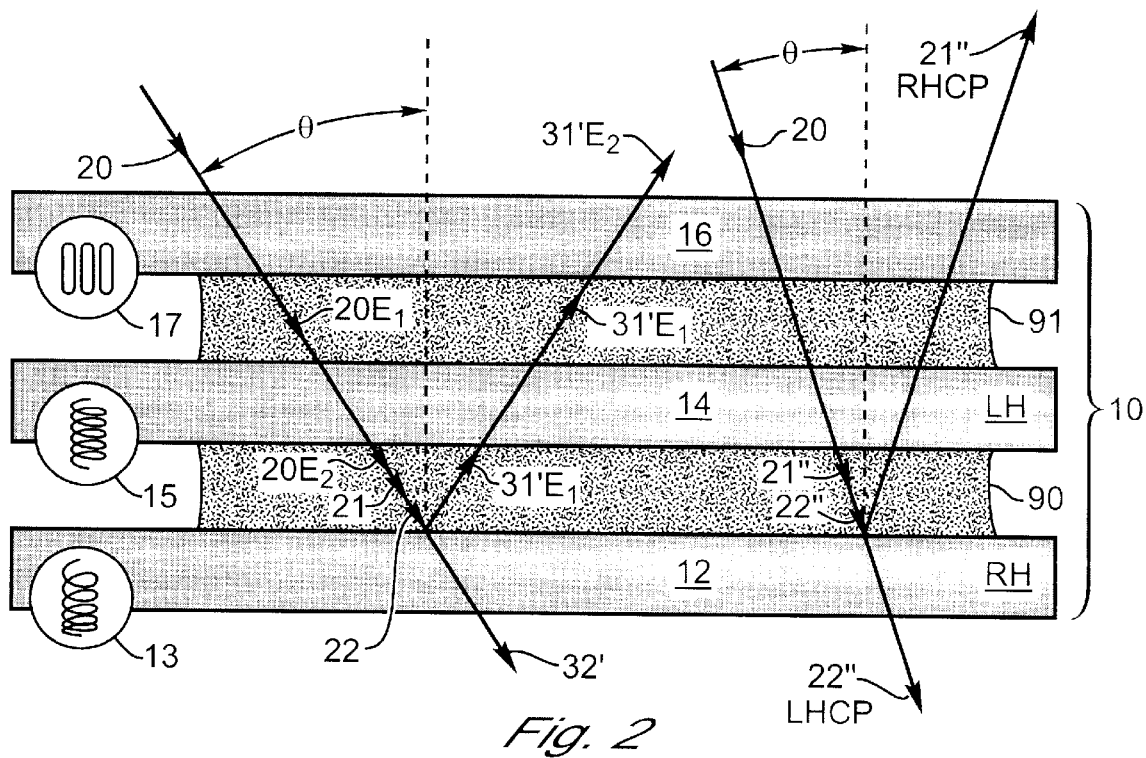
FIG. 2 is a schematic diagram of a super-wide-angle CLC-based reflective broadband polarizer comprising a CLC-based broadband polarizer with the compensation layers for the reflected light.
Figure 3A:
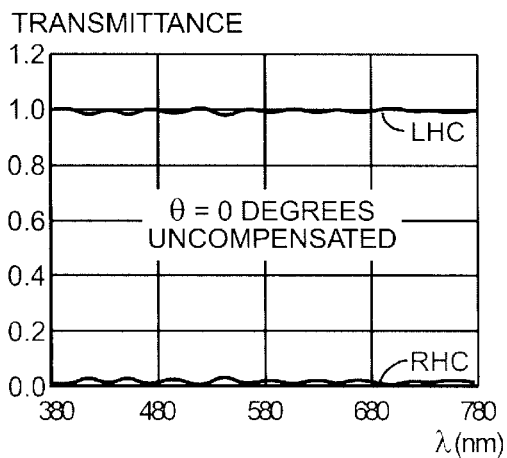
FIG. 3 shows the transmittance of right handed and left handed circularly polarized incident light through a CLC-based broadband analyzer to compare the CLC based reflective broadband analyzer to the super-wide-angle CLC-based reflective broadband analyzer.
Figure 3B:
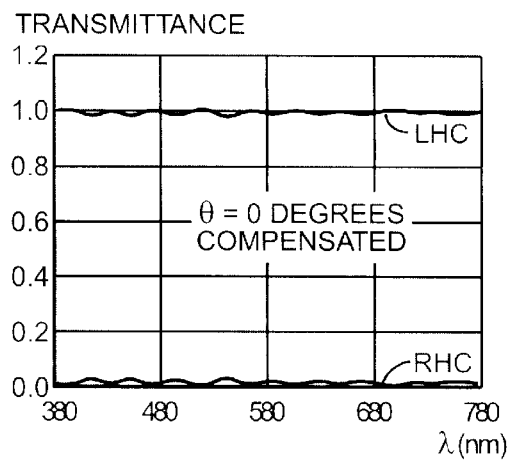
Figure 3C:
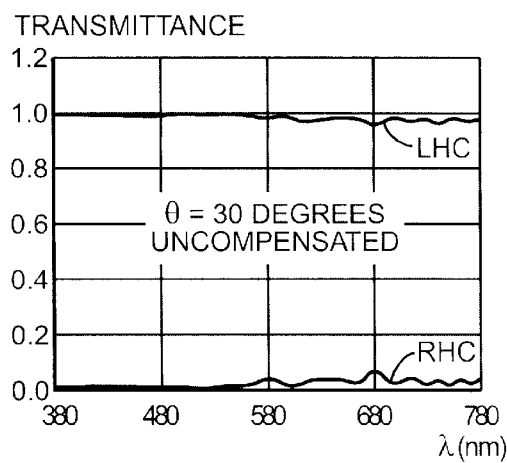
Figure 3D:
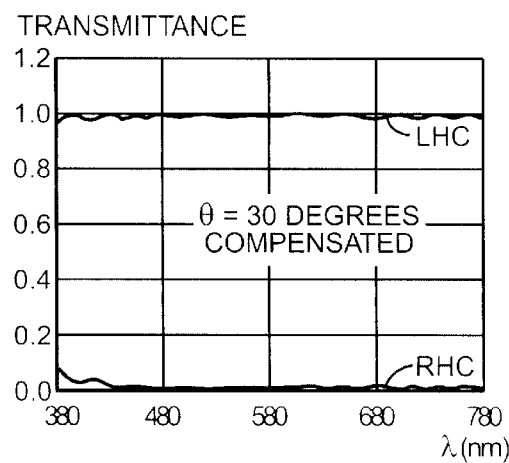
Figure 3E:
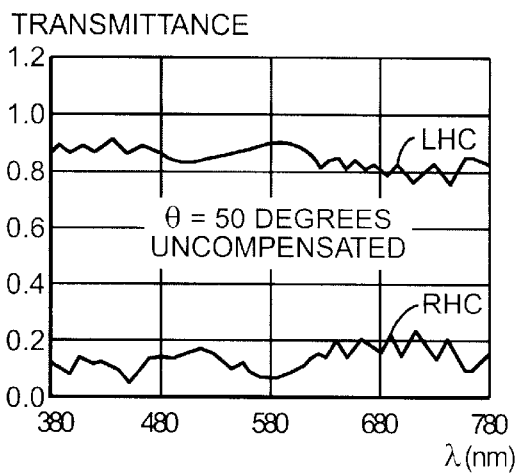
Figure 3F:
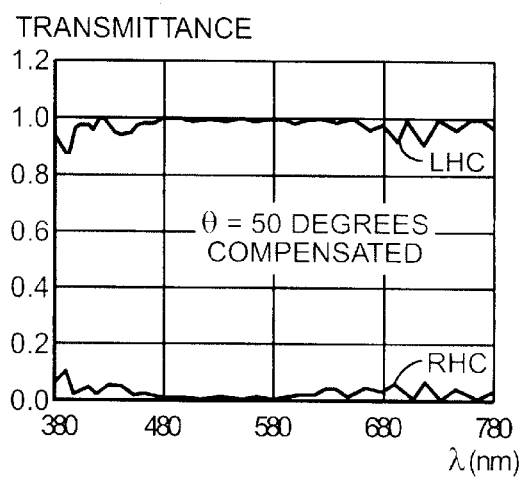
Figure 3G:
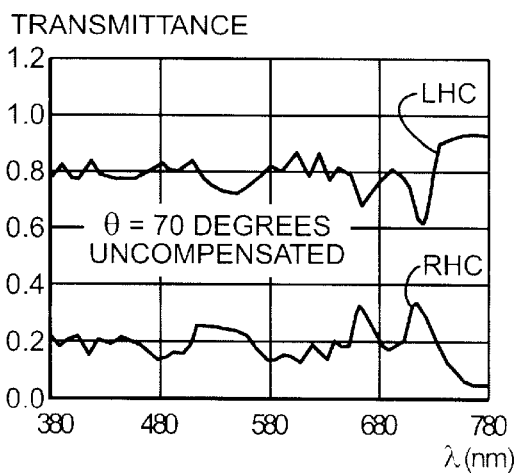
Figure 3H:
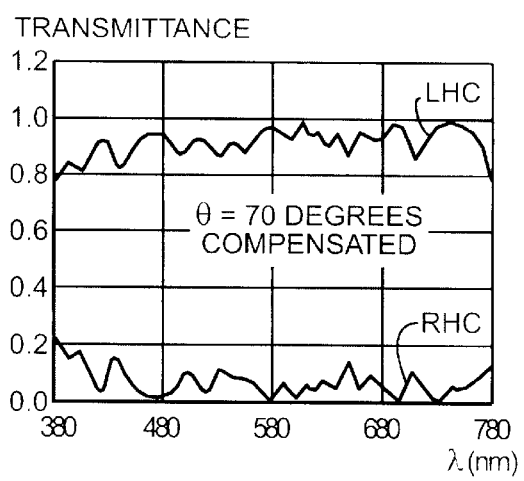
Figure 4A:
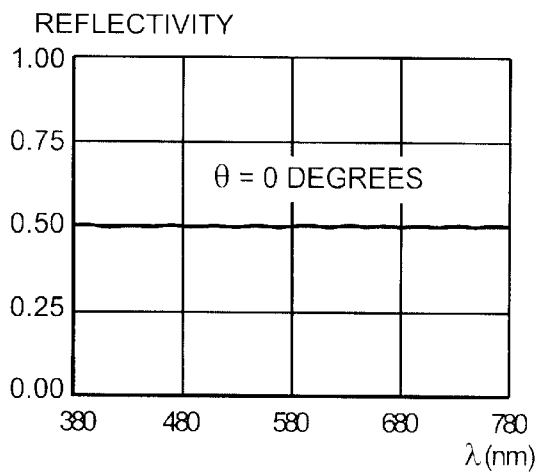
FIG. 4 shows the reflectivity for unpolarized incident light of the super-wide-angle CLC based broadband polarizer in reflection mode for different incident angles over the visible light spectrum. The light reflected from the polarizer is analyzed through an ideal circular analyzer.
Figure 4B:
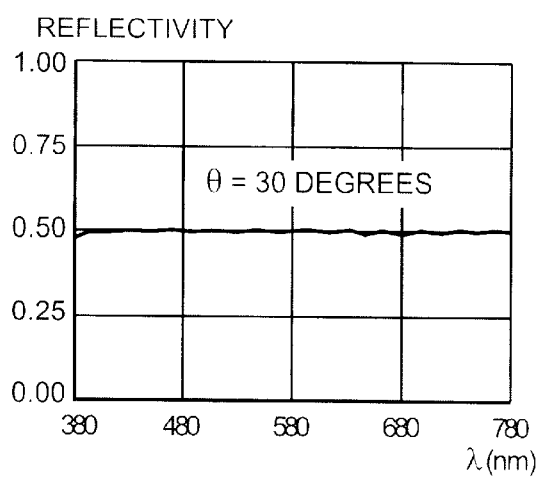
Figure 4C:
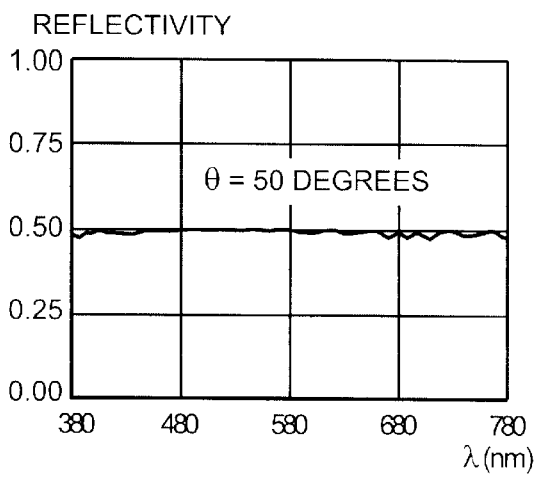
Figure 4D:
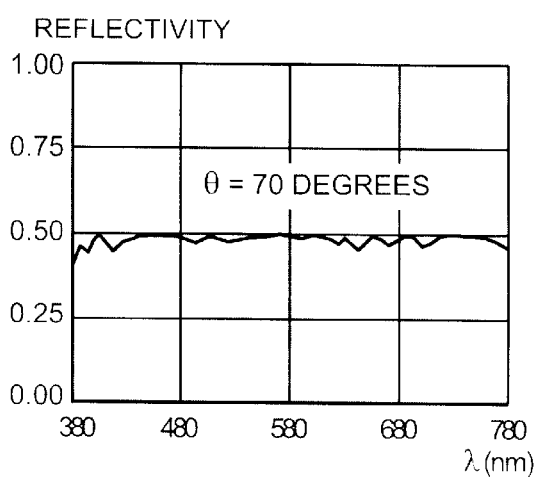
Figure 5A:
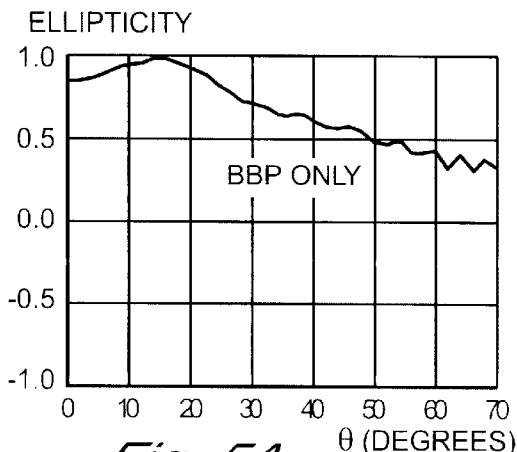
FIG. 5 shows the ellipticity and major axis orientation of the reflected light from the CLC broadband polarizer alone, as alone plus with as compensated by the IR CLC layer, and with the IR CLC layer and the homeotropic layer.
Figure 5B:
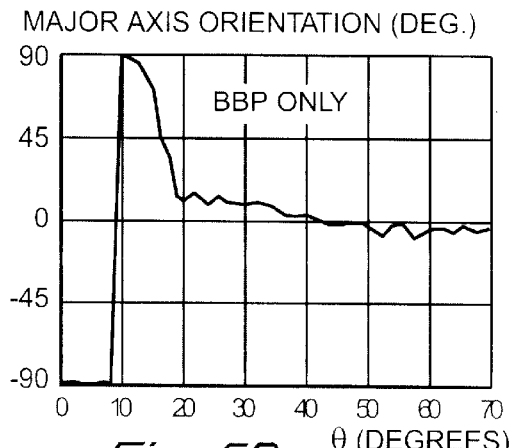
Figure 5C:
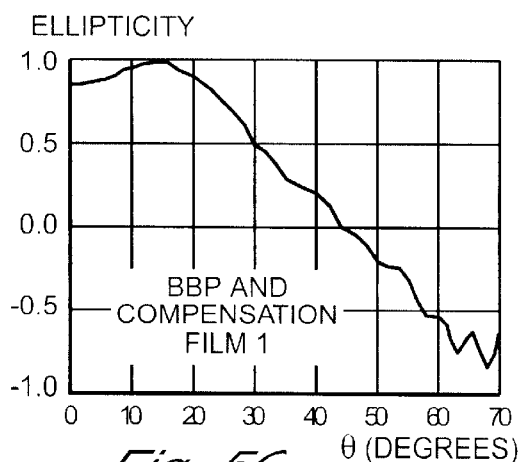
Figure 5D:
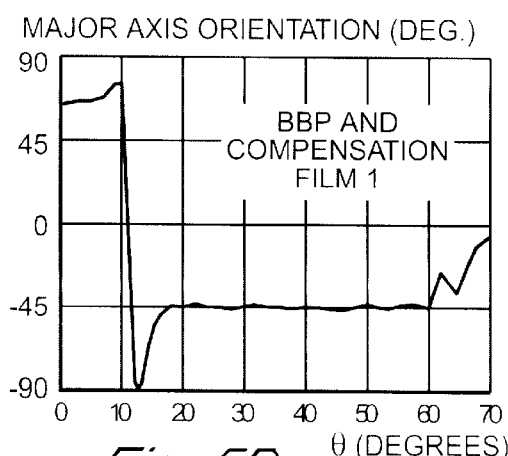
Figure 5E:
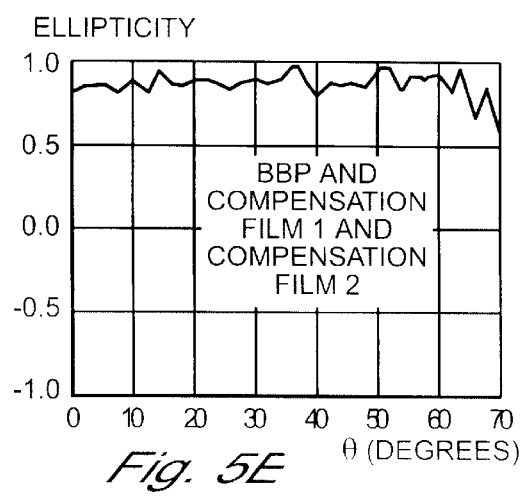

To aid in the understanding of the invention, a comparison of the results of light striking the broadband polarizer 12 without compensating films 14 and 16 and with compensating films 14 and 16 is described with the aid of FIGS. 1 and 2 with the results shown in the graphs of FIGS. 3 and 4.

FIG. 1 shows two unpolarized beams 20 approaching a right handed CLC-based broadband polarizer. The beam on the right is at a low angle of incidence and the beam on the left is at a high angle of incidence. The beams are incident on a right handed CLC-based broadband reflective circular polarizer 12 with bandwidth from 380 nm to 1100 nm, which has variable pitch helixes of CLC material with the axis of the helix normal to the surface of the film and the long pitch at the top of the helix as shown in microscopic view 13. Unpolarized light 20 is composed of right handed circular polarized light 21 and left handed circular polarized light 22.

Although the bandwidth from 380 nm to 1100 nm is used in the examples herein, the cholesteric liquid crystal materials used as reflectors are also made for reflecting UV and IR wavelengths.

Referring to FIG. 1, for normal incidence and low angles of incidence the left handed circularly polarized light 22 is transmitted by the right handed CLC-based broadband reflective circular polarizer 12, and emerges as left handed light 22', the right handed circularly polarized light 21 is not transmitted but rather is reflected by the right handed CLC-based broadband reflective circular polarizer 12 as right handed light 21'.

When circularly polarized light is incident normal or near normal to the surface of the right handed CLC broadband polarizer 12, the CLC helixes have their axis aligned parallel to the light direction, the circularly polarized light sees a circular cross section of the CLC material, and there is near 100% reflection of the incident right handed circularly polarized light 21 and near 100% transmission of the left handed circularly polarized light 22 achieved. This is illustrated at the left side of FIG. 3, where the transmittance of left-handed 22 and right handed 21 circular light through the broadband polarizer 12 is shown at different incident angles. The graphs in FIG. 3 also indicate that when unpolarized light 20 is incident normal to the surface, i.e. θ=0° at low angles of incidence, its left handed circularly polarized component 22 is nearly 100% transmitted as left handed circularly polarized light 22'. Similarly, the graph shows that the right handed circularly polarized component 21 is nearly 100% not transmitted. Therefore, nearly 100% of the right handed circularly polarized component is reflected as right handed circularly polarized light 21'.

As FIG. 1 shows on the left side, as the angle of incidence θ increases, the incoming unpolarized light 20 having right handed 21 and left handed 22 circularly polarized components, sees an elliptical cross section of the helixes of the CLC material 12. Therefore the right 21 and left 22 handed circularly polarized light gets distorted as it passes through the right handed CLC broadband polarizer 12, resulting in lower percentages of transmitted left handed circularly polarized light and increases in the transmittance of right handed circularly polarized light. This can be seen on the graphs at the left side of FIG. 3. For unpolarized incident light 20 the transmitted light 32 is a mixture of left handed circularly polarized light and right handed circularly polarized light, and is thus elliptically polarized. Similarly, at large angles of incidence θ there is a reflection of a lower portion of the right handed circularly polarized light and an increase in the reflectance of left handed circularly polarized light. For unpolarized incident light 20 the reflected light 31 is a mixture of left handed and right handed circularly polarized light, and is thus elliptically polarized. These distortions at larger angles of incidence destroy the polarization capability of the broadband polarizer 12. There are also distortions of the spectra when viewed at large angles according to the formula $\lambda(\theta)=\lambda(0)\cos\theta$.

FIG. 2 shows a super-wide-angle CLC-based reflective broadband polarizing film 10, having compensating layers 14 and 16 attached to the top of the right handed CLC broadband polarizer 12 facing its long pitch side. This compensated configuration acts as a super-wide-angle circular analyzer in both transmission and reflection modes. An adhesive 90 with an index of refraction for matching the index of refraction for layers 12 and 14 is used to increase the optical efficiency of the super-wide-angle CLC based reflective broadband circular polarizing film 10. A similar adhesive 91 is used between the layers 14 and 16.

As shown in FIG. 2, compensating layer 16 is a homeotropic film having its molecules lined up with the long axes perpendicular to the surface of the layer as shown in microscopic view 17. Homeotropic layers can be uniaxial films with vertical optical axis, low molecular weight liquid crystal films, or polymerizable liquid crystal films. Homeotropic layer 16 changes the incident circularly polarized light to elliptical with ±45-degree major axis orientation. Layer 14 is an infrared (IR) CLC layer with a helical structure having an axis perpendicular to the surface of layer 14. The pitch of the IR CLC film is outside the reflection band of the broadband polarizer. The CLC film can be any low molecular CLC material, polymerizable CLC material, or material with chiral structure, having constant or variable pitch in the IR region. The CLC material will reflect IR and transmit all other frequencies. The IR CLC layer 14 rotates the major axis and changes the shape of the ellipse so that the polarization state coincides with the eigen-state of the broadband polarizer 12. As FIG. 3 shows at the right side, with the configuration in FIG. 2 right handed circular light is completely reflected, and left-handed circular light is completely transmitted for incident angles up to at least 70 degrees for the entire visible range. Therefore, the configuration in FIG. 2 serves as a super-wide-angle CLC analyzer operating in both transmission and reflection modes. For normal or small angles of incidence θ, the transmitted left handed circular polarized light 22" and reflected right handed circularly polarized light 21" are approximately the same as without compensating layers 14 and 16 as FIG. 3 shows, thus preserving the good behavior at small angles. For large angles of incidence θ, the eigen-states of the broadband polarizer 12 are elliptical, and thus right handed circular light 21 is partially reflected, and left-handed circular light 22 is partially reflected. Compensating layers 14 and 16 change the incident left-handed circular (right-handed circular) light to an elliptical state that is completely transmitted (reflected) from the polarizer 12.

The configuration in FIG. 2 also acts as a super-wide-angle CLC polarizer operating in reflection mode. Unpolarized light remains unpolarized when passing through layers 16 and 14. For incident light 20 normal or near normal to the surface, the light 21' reflected from the broadband polarizer 12 is circularly polarized, and it will pass practically unchanged through layers 14 and 16. As before with the uncompensated RH CLC broadband polarizer 12, normal or near normal light will be reflected as light 21" and transmitted as light 22" with values close to the uncompensated light 21' and 22' from FIG. 1, which are both circularly polarized with opposite handedness.

For incident light 20 at larger angles of incidence, as shown on the left-hand portion of FIG. 2, unpolarized incident light emerges from homeotropic layer 16 as light $20_{E1}$ which is still unpolarized light, it then passes through IR CLC layer 16 and emerges as light $20_{E2}$, which is still unpolarized light in the visible region. As before, the light is polarized at the right handed CLC broadband polarizer 12, with transmitted light 32' being similar to light 32 from FIG. 1 and reflected light 31' being similar to light 31 from FIG. 1. However, as light 31', which is a mixture of right handed and left handed circularly polarized light passes through IR CLC layer 14 it will be acted on and transformed by rotating the major axis to ±45 degrees emerging as $31'_{E1}$. Preferably, the IR CLC layer should be left handed when combined with a right handed broadband polarizer, or the order of the two compensation films should be reversed. The light then enters homeotropic layer 16 where it is converted into circularly polarized light emerging as light $31'_{E2}$.

FIG. 3 shows graphically the transmittance of the right handed 21 and left handed circularly polarized light 22 at different angles of incidence for the CLC broadband polarizer 12. FIG. 3 also shows the comparative transmittance compensated by compensation layers 14 and 16. Compensation films 14 and 16 are used to correct for the distortions at large angles of incidence while retaining the characteristics of undistorted light at normal incidence and small angles of incidence.

FIG. 4 shows that when white visible light is used as the unpolarized light 20, the reflected beam 21" for low incident angles and beam $31'_{E2}$ for large incident angles, as seen through a perfect circular analyzer, of the super-wide-angle CLC based broadband circular polarizer, as shown in FIG. 2, is about 50% showing that it is a good polarizer in reflection mode all across the visible spectrum for angles up to at least 70 degrees. As described above, the incident light 20 on the helixes 13 of the CLC broadband polarizer 12, when at large angles of incidence, sees an elliptical cross section and not a circular cross section as light normal to the surface would see. Therefore, at oblique incident angles the eigen-states of the uncompensated broadband polarizer 12 are not circular but elliptical, and the role of the compensation films for the polarizer in reflection mode is to convert the elliptically polarized reflected light 31' back to circular.

In order to achieve saturated reflection and transmission from the broadband polarizer 12 for a large bandwidth, sufficient thickness and large enough birefringence are a prerequisite. Under these conditions the CLC broadband polarizers 12 exhibit the universal behavior that the light reflected 31 or transmitted 32 through the CLC broadband polarizing film 12 at large incident angles has polarization state such that the orientation of the major axis of the polarization ellipse is either in or perpendicular to the plane of incidence. Light with such a polarization state cannot be converted back to circular by homeotropic films 16 only, because these films exhibit only linear, and not the necessary circular birefringence. Only light that has a major axis orientation of its polarization ellipse at ±45 degrees with respect to the incident plane can be successfully converted back to circular at oblique incident angles using homeotropic films with positive and/or negative birefringence.

The major axis orientation of the light reflected from the CLC broadband polarizer 12 can be rotated by the IR CLC film to approximately +45 or −45 degrees. The role of IR CLC layer 14 is to rotate the major axis of the polarization ellipse of reflected light 31' to +45 or −45 degrees, and at the same time change the shape of the ellipse, after which the light can be converted to circular with an appropriate homeotropic film 16. To illustrate this point, FIG. 5 shows the behavior of the ellipticity and the major axis orientation of the light reflected from the CLC broadband polarizer 12 alone, from the CLC broadband polarizer 12 and IR CLC layer 14, and the ellipticity from the CLC broadband polarizer 12, the IR CLC layer 14 and the homeotropic layer 16, when unpolarized light 20 with a wavelength of 550 nm is incident on the system as a function of the incident angle. The ellipticity e is defined in such a way that e=−1 corresponds to Left Handed Circular (LHC) light, e=+1 corresponds to Right Handed Circular (RHC) light, and e=0 is associated with linearly polarized light. Any other value of e, intermediate between −1 and 1, corresponds to elliptically polarized light, which is right-handed for a positive e, and left-handed for a negative e. The orientation of the major axis of the polarization ellipse varies from −90 to 90 degrees, and is defined following standard conventions. FIG. 5 shows that light 31' reflected from the CLC broadband polarizer 12 only (with no compensation films) has a major axis oriented at 0 degrees for large incident angles. Thus, the light is elliptically polarized, with the major axis of the ellipse being in the plane of incidence. The addition of IR CLC layer 14 causes changes in both ellipticity and major axis orientation, and after passing through this compensation film, the light $31'_{E1}$ reflected from the CLC broadband polarizer 12 has its major axis orientation rotated to a −45 degree angle. This light is converted to right-handed circular $31'_{E2}$ by passing through homeotropic film 16. No figure for the major axis orientation of the light reflected from the three-layer system is presented. The light now, for all practical purposes, has a right-handed circular polarization, and thus its major axis is not defined.

As can be readily understood from the above, the reflected and transmitted light through the CLC broadband polarizer are symmetric. Therefore the reflected light cases shown in FIGS. 1 and 2, and the light transmitted case of a super-wide-angle CLC based transmissive broadband circular polarizer 40 as shown in FIG. 6 operate in an identical manner.

FIG. 1 shows how light 22' and 32 are acted on by the CLC broadband polarizer 12. The transmitted light 22' and 32 can be acted on as shown in FIG. 6 by the IR CLC layer 14 and homeotropic layer 16 in a like manner as shown above for the reflected light cases in FIG. 2. Therefore, when unpolarized light is incident, the transmitted light will be converted to circular and will exhibit the same behavior as shown in FIG. 4, where the reflectivity is substituted with the transmittance, and the transmitted light is analyzed with an ideal left handed circular analyzer. Thus the configuration in FIG. 6 is a super-wide-angle CLC-based broadband polarizer operating in transmission mode.

Figure 6:
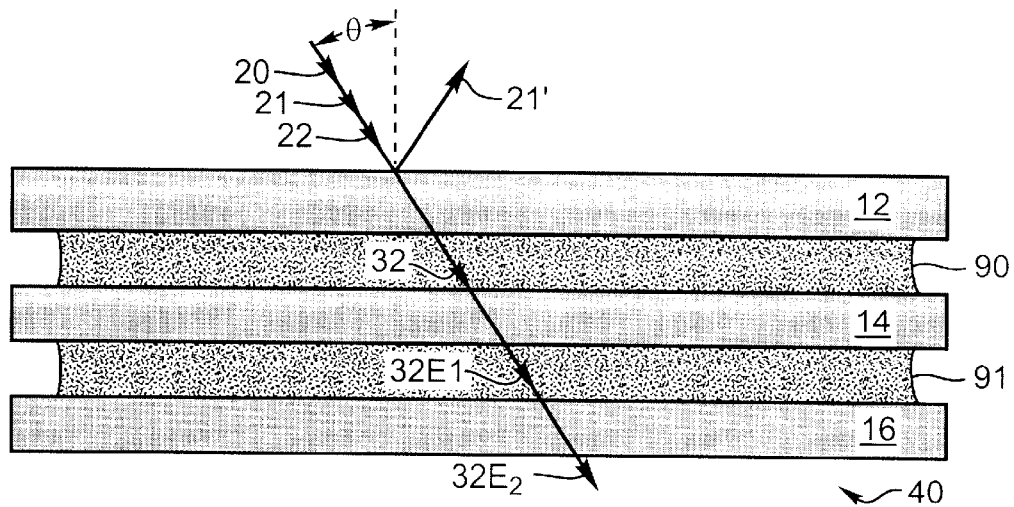
FIG. 6 is a schematic diagram of a super-wide-angle CLC-based reflective broadband polarizer in transmission mode comprising a CLC-based broadband polarizer with the compensation layers for the transmitted light.
Figure 7:
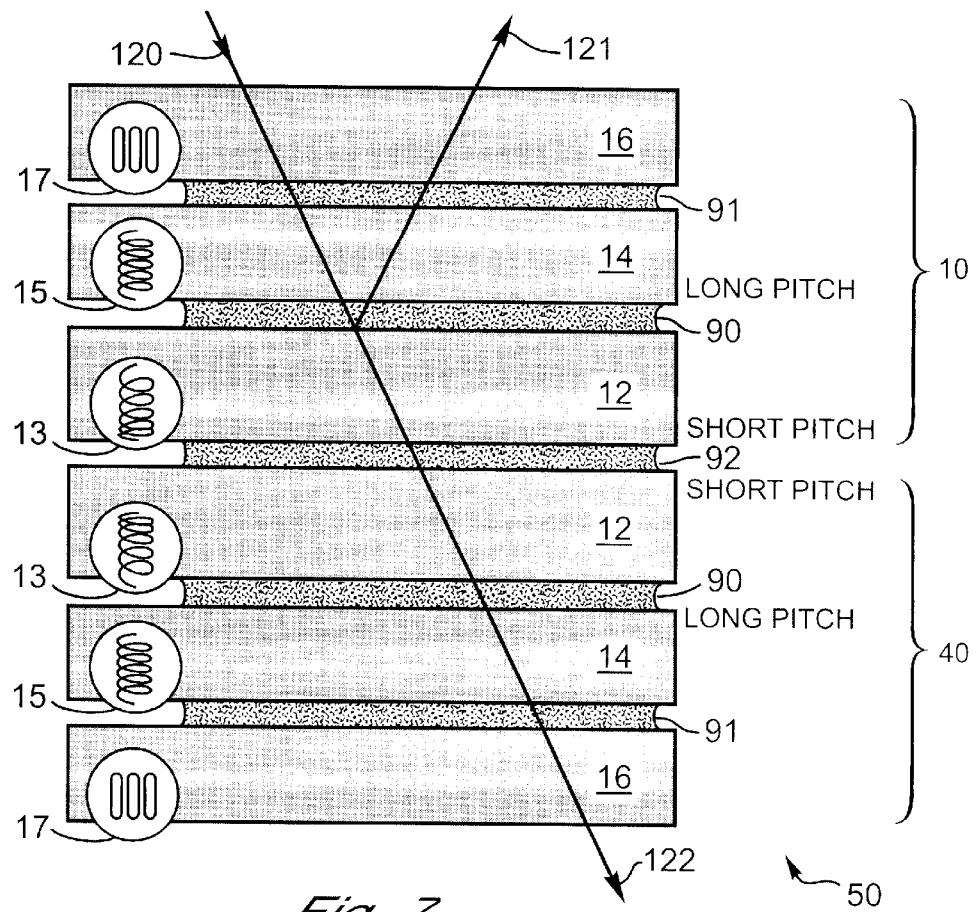
FIG. 7 shows a schematic diagram of a super-wide-angle CLC-based broadband polarizer and analyzer operating in transmission and reflection modes, comprising the super-wide-angle CLC-based broadband reflective polarizer of FIG. 2 and the CLC-based transmissive broadband polarizer of FIG. 6 placed back to back.

FIG. 7 shows a super-wide-angle CLC-based broadband polarizer and analyzer 50 for both transmission and reflection, comprising the super-wide-angle CLC-based broadband reflective polarizer 10 of FIG. 2 and the super-wide-angle CLC-based transmissive broadband polarizer 40 of FIG. 6 placed back to back preferably with like pitch of the CLC broadband polarizers adjacent. Unpolarized light 120 will now be 50% reflected as right handed circular polarized light 121 and 50% transmitted as left handed circular polarized light 122. Similarly, right-handed light will be completely reflected as right-handed, and the left-handed—completely transmitted as left-handed. The light passing through the adjacent broadband polarizers 10 and 40 is not adversely effected by being transmitted through two broadband polarizers 12 placed back to back. The resulting corrections for ellipticity and color correction due to angular incidence apply for the combined reflecting and transmitting polarizer 50 of FIG. 7 as for the separate super-wide-angle CLC based reflective broadband circular polarizer 10 of FIG. 2 and the super-wide-angle CLC based transmissive broadband circular polarizer 40 of FIG. 6. Adhesives 90, 91 and 92 used between layers 12 and 14, 14 and 16, and 12 and 12 respectively are matched to the index of refraction of the layers to increase the optical efficiency of the super-wide-angle CLC based reflective broadband polarizing films.

Figure 8:
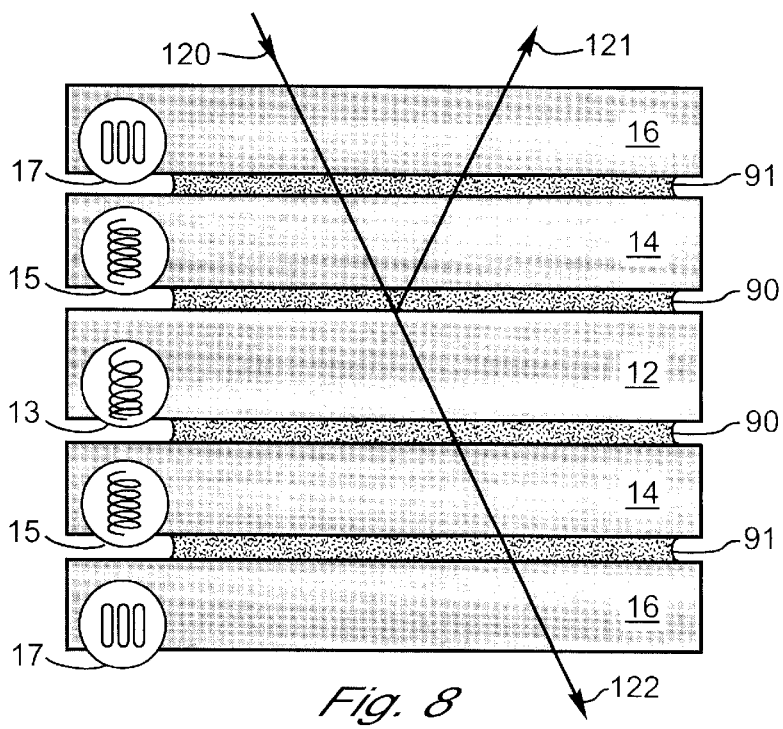
FIG. 8 shows a modification of FIG. 7 in which only one CLC broadband polarizer 12 is used.
Figure 9A:
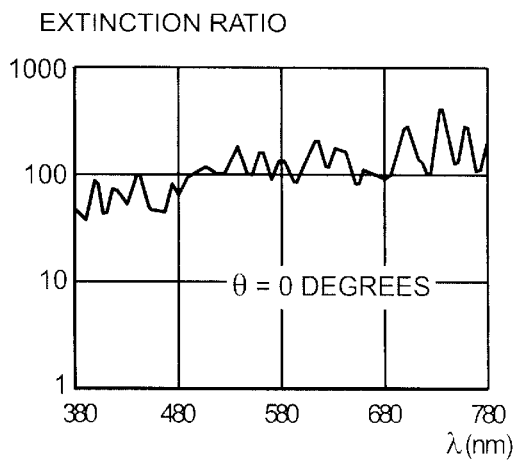
FIG. 9 shows the extinction ratio of the super-wide-angle CLC-based reflective broadband polarizer operating in transmission and reflection modes at different angles of incidence.
Figure 9B:
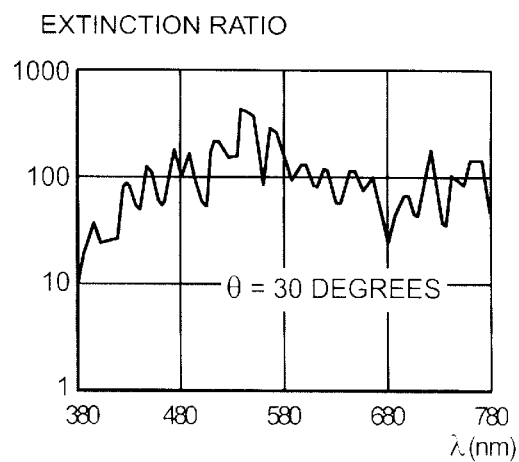
Figure 9C:
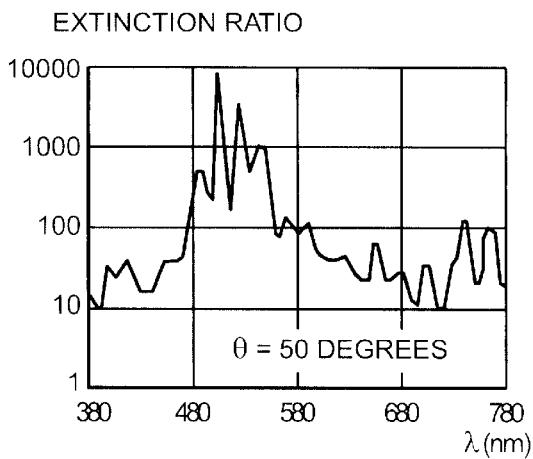
Figure 9D:
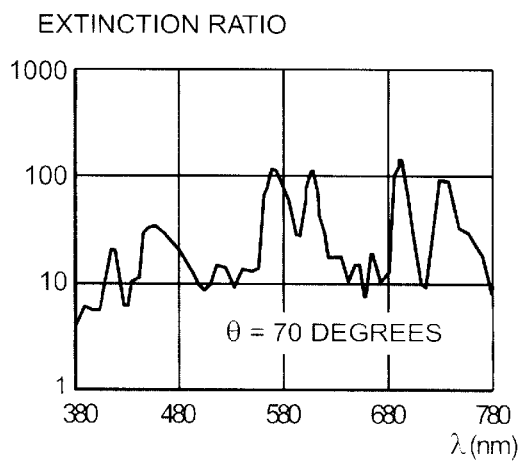

FIG. 8 shows a modification of FIG. 7 in which only one CLC broadband polarizer 12 is used. The IR CLC layers 14 and the homeotropic layers 16 may have different structure for the reflecting and transmitting layers to maximize efficiency.

FIG. 9 shows the extinction ratio of the super-wide-angle CLC-based reflective broadband polarizer 50 operating in transmission and reflection modes at different angles of incidence for the entire visible range. The plots are valid for both reflection and transmission modes if the reflection extinction ratio is defined as the right-handed circular component to the left-handed circular component in the reflected light, and as the opposite ratio for the transmitted light. As can be seen in the figures, the average extinction ratio remains over 10:1 even for incident angle of 70 degrees. Therefore the polarizer 50 of FIG. 7 is useful in many devices such as LCD displays and smart windows viewed by humans.

Since the super-wide-angle CLC-based broadband polarizer and analyzer in reflection mode 10, the super-wide-angle CLC-based broadband polarizer in transmission mode 40, and the super-wide-angle CLC-based broadband polarizer and analyzer in both transmission and reflection modes 50 can be used at large angles of incidence without loss in the left handed and right handed polarization properties and without spectral changes due to angle of viewing, they can be used for many applications.

Figure 10:
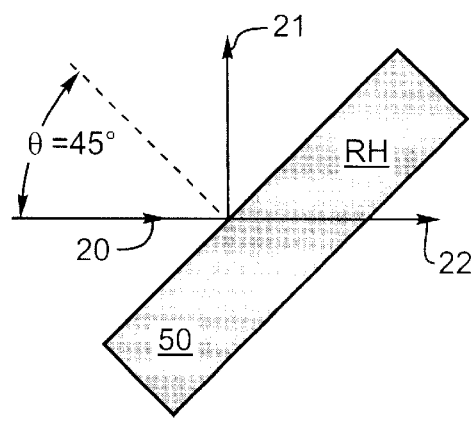
FIG. 10 is a schematic diagram of a polarizing beam splitter incorporating the super-wide-angle broadband polarizer.

As shown in FIG. 10, the super-wide-angle CLC-based broadband polarizer 50 of FIG. 7 or FIG. 8 is used as a polarizing beam splitter. When unpolarized light 20 is incident on the super-wide-angle CLC-based broadband polarizer 50 at a 45 degree incident angle, the right handed circular polarized component 21 is reflected, and the left handed circular polarized component 22 is transmitted. Beams 21 and 22 have opposite circular polarizations, and propagate in perpendicular directions. The same system can be used as a beam combiner for circularly polarized light. If beam 21 and beam 22 are incident on the polarizer at its opposite sides and in perpendicular directions, the resulting light 20 will be a combination of the two. If the super-wide-angle CLC-based broadband polarizer 50 had a left handed broadband polarizer 12 instead of a right handed one as shown, the reflected 21 beam and transmitted beam 22 would have opposite handedness.

Figure 11:
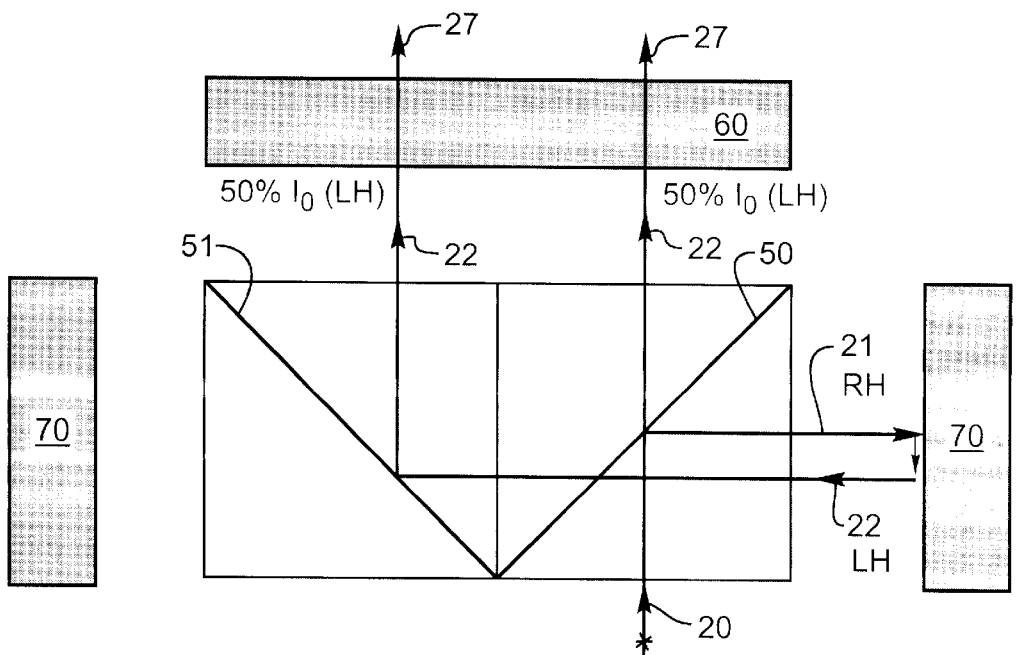
FIG. 11 is a schematic diagram of a polarizing light source for turning unpolarized light into circularly polarized light or lineally polarized light.

FIG. 11 shows unpolarized light 20 being converted to left handed circularly polarized light 22 by use of a right handed and a left handed super wide CLC-based broadband polarizers 50 and 51 respectively, and mirrors 70. Unpolarized light 20 is incident on the right-handed (RH) super wide CLC-based broadband polarizer 50. The incident light is 50% reflected as right handed (RH) circular light polarized light 21 and 50% transmitted as left-handed (LH) circular polarized light 22. The reflected RH light 21, after being reflected by the mirror 70, becomes LH circularly polarized light 22 and is transmitted by the super wide CLC-based broadband polarizer 50. However, it is reflected by the adjacent left handed super wide CLC-based broadband polarizer 51. Therefore, 100% of the unpolarized incident light is transmitted as left-handed circular polarized light 22. Another feature of this device is that the exiting polarization depends on which super-wide-angle CLC polarizer 50 or 51 is facing to the incident unpolarized light. If the unpolarized light is incident onto the RH super-wide-angle polarizer 50, the output is left-handed. However, if the light is incident onto the LH super-wide-angle polarizer 51, the output is right-handed. If a quarter wave plate 60 is attached to the exiting terminal of the device, a linear polarization 27 is output, which can be altered between "S" and "P" states by shifting the incident light position. For example, assume an "S" polarization is output when the unpolarized light is incident onto the RH CLC super-wide-angle polarizer 50. This linear polarization is altered to "P" state if the unpolarized light is incident onto the LH CLC super-wide-angle polarizer 51.

Figure 12:
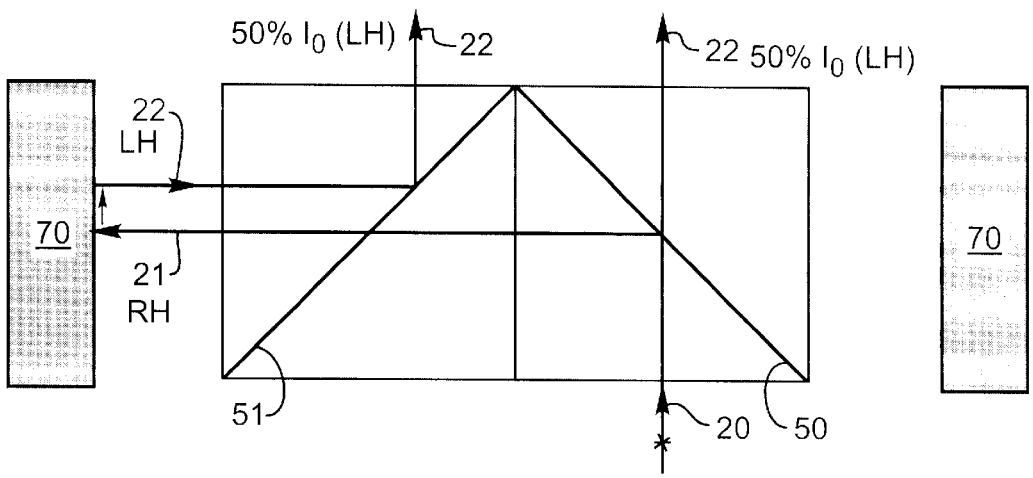
FIG. 12 is a schematic diagram of a second embodiment of a polarizing light source similar to FIG. 11 for turning unpolarized light into circularly polarized light or lineally polarized light.

Alternatively, FIG. 12 illustrates another configuration whose working principle is the same as that in FIG. 11. This device has the same property of outputting different polarization depending onto which super-wide-angle polarizer the light is incident.

Figure 13:
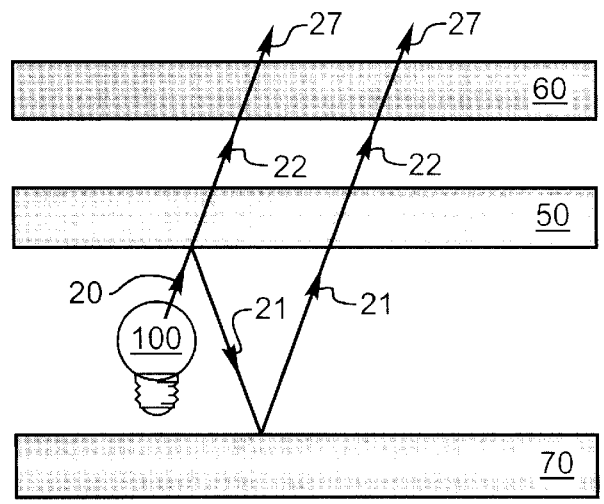
FIG. 13 is a schematic diagram of a polarizing light source for turning unpolarized light into circularly polarized light or lineally polarized light.

FIG. 13 shows another polarizing light source wherein a source of unpolarized light 100 such as a light bulb is placed between a mirror 70 and a super-wide-angle CLC based broadband circular polarizer 50. In this configuration the super-wide-angle CLC-based broadband polarizer in transmission mode 40 can be incorporated instead of 50. Unpolarized light 20 from light source 100 incident on a right handed super-wide-angle CLC based broadband circular polarizer 50 will be partially transmitted as left handed circularly polarized light 22 and partially reflected as right handed circularly polarized light 21. The reflected right handed circularly polarized light 21 with be reflected from mirror 70 as left handed circularly polarized light 22 and will be transmitted through the right handed super-wide-angle CLC based broadband circular polarizer 50. If linearly polarized light is desired, a quarter wave plate 60 will transform the left handed circularly polarized light to linearly polarized light 27.

The super-wide-angle broadband polarizer 40 or 50 can be incorporated into a brightness enhancement system for a liquid crystal display. A brightness enhancement system for a liquid crystal display is shown in U.S. patent application Ser. No. 08/715,314 (now U.S. Pat. No. 6,188,460), filed Sep. 16, 1996, entitled "Image Display Panel having a Backlighted Structure and a Single-Layer Pixelated Array of Reflective Type Spectral Filtering Elements where Light is Recycled for Producing Color Images with Enhanced Brightness" which is hereby attached hereto and made a part hereof by reference. Essentially the enhanced brightness system as shown in the above patent application has a CLC broadband polarizer 12 as in FIG. 1 with unpolarized light 20 generated inside the display passing through the CLC broadband polarizer 12 to transmit light 22' or 32 from inside of the LCD display. As described above such light is subject to distortions at large angles of incidence and when viewed from large angles there are color distortions. By using a super-wide-angle CLC based transmissive broadband polarizer 40 as in FIG. 6 or 50 as in FIG. 7, the color distortion with viewing angle is largely eliminated.

Figure 14A:
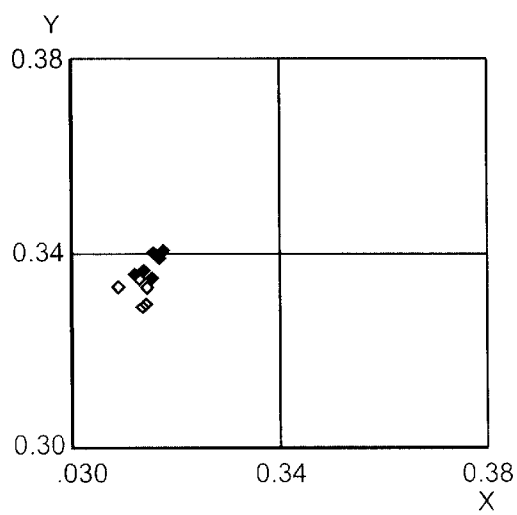
FIG. 14 is a graph of the chromaticity of an LCD brightness enhancement system incorporating the compensated broadband polarizer as compared to the uncompensated broadband polarizer at various azimuthal angles and for polar viewing angles from 0 to 70 degrees.
Figure 14B:
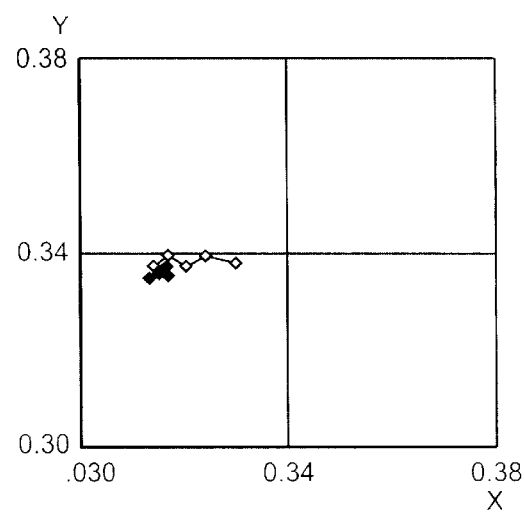

In LCDs operating with linearly polarized light, a quarter wave plate introduced to linearly polarize the light has an optical axis oriented parallel to the polarizer surfaces, and its introduction breaks the rotational symmetry of the system. Thus, it is not sufficient anymore to discuss the behavior of the enhanced brightness display only in terms of the polar viewing angle θ. Different azimuthal directions also need to be considered. In order to achieve achromatic backlight behavior in an enhanced brightness display with a compensated broadband polarizer 40 or 50 for all incident angles, it is sufficient to use a quarter-wave plate of 0th order whose design wavelength lies approximately in the middle of the visible range. (A quarter wave plate for 560 nm was used to obtain the results for the graphs in FIG. 14). The results for the chromaticity behavior of an enhanced brightness display utilizing the compensated broadband polarizer 40 from FIG. 6 is shown in FIG. 14 for four different azimuthal orientations of the optical axis of the quarter-wave plate with respect to the incident plane. Each figure contains results for polar viewing angles from 0 to 70 degrees. For comparison, the chromaticity coordinates utilizing the uncompensated broadband polarizer are shown with open rhombs. As can be seen in FIG. 14, the enhanced brightness display incorporating the compensated polarizer 40 of FIG. 6 has a dramatically improved angular behavior over an uncompensated broadband polarizer 12 alone. It remains achromatic for polar viewing angles of up to at least 70 degrees in all azimuthal directions.

A display device 159 such as shown in FIG. 15 has a backlight 150 emitting unpolarized light. The light passes through a collimator 151. Then the light passed through a reflective polarizer 40 or 50 as shown in FIG. 6 or FIG. 7, before entering a reflective CLC color filter to transmit colors for a display. The pixelized colors pass through a quarter wave plate 154 to make colored linearly polarized light which enters a liquid crystal light valve to selectively bypass or block the light from the pixels in the reflective CLC color filter 153. The light transmitted from the light valve 155 passes through a diffuser such as a frosted glass diffuser 156 and an analyzer 157 to be viewed by a user of the display. The analyzer 157 and the diffuser 156 may be placed in the display 159 in reverse order. Ray 158 emanating from backlight 150 will emerge as colored light linearly polarized and have a large viewing angle without distortion of its color because of the reflective polarizer 151 in display 159.

The frosted glass 157 is used as a polarizing preserving diffuser. The diffuser 157 is necessary to increase the viewing angle when a light collimator 151 is jointly used to better control the light incident angle onto the reflective cholesteric liquid crystal color filter 153. Since the light incident on the color filter 153 is collimated by the collimator 151, the color distortion of the filter due to the polarization distortion, and Bragg shift will be minimized. In order to increase the display viewing angle, a polarization preserving diffuser 156 is desired to be placed before the linear analyzer 157 of the display 159. A surface frosted glass behaves well as such a polarization preserving diffuser 156. The display of FIG. 15 with the reflective polarizer 40 or 50 reduces the color distortions at large viewing angles of the display 159. In combination with the reflective cholesteric liquid crystal color filter architecture of this application, the display 159 having the reflective polarizer provides an improved display device. U.S. Pat. No. 6,188,460 discloses an example of a liquid crystal display device in which the broadband polarizer of this invention may be used.

U.S. patent application Ser. No. 08/739,467 (now U.S. Pat. No. 6,034,753), filed Oct. 29, 1996, entitled "Circularly Polarizing Reflective Material Having Super Broad-Band Reflecting and Transmission Characteristics and Method of Fabricating and Using Same in Diverse Applications", is hereby made a part hereof and incorporated herein by reference to show an example of broadband CLC materials suitable for use in this application.

Another feature of the cholesteric liquid crystal material in the CLC-based broadband reflective circular polarizer 12 is that it is electrically switchable. By applying an electric field to layer 12 the variable pitch helixes of CLC material can be realigned so that they do not reflect light 20 at all. The switchable nature of these variable pitch helixes of CLC materials is useful in many devices including smart windows. An example of a smart window is disclosed in U.S. patent application Ser. No. 08/805,603 (now U.S. Pat. No.

5,940,150), filed Feb. 26, 1997, entitled "Electro-Optical Glazing Structures having Total-Reflection and Transparent Modes of Operation for use in Dynamical Control of Electromagnetic Radiation", which is hereby made a part hereof and incorporated herein by reference.

Figure 16:
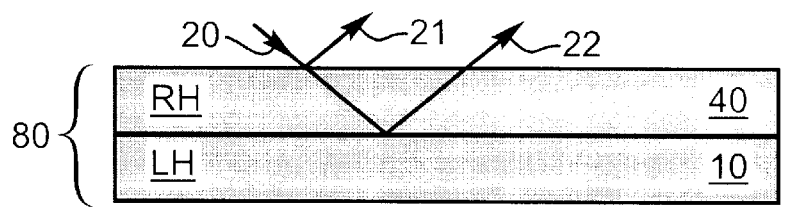
FIG. 16 is a schematic diagram of a passive smart window.
Figure 17:
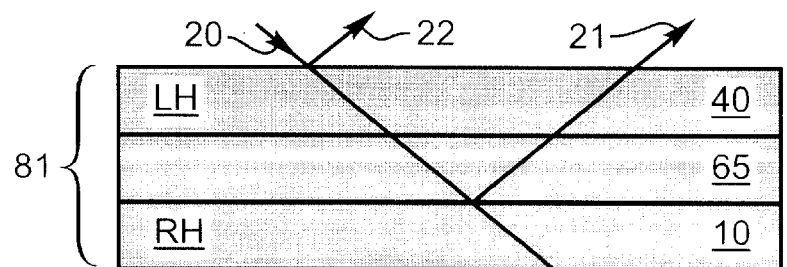
FIG. 17 is a schematic diagram of an active smart window.

FIGS. 16 and 17 show how a smart window benefits from the super-wide-angle CLC based reflective broadband circular polarizers. FIG. 16 has a top layer of a right handed super-wide-angle CLC based broadband circular polarizer 40 which receives outside unpolarized light 20 and reflects half of it, and a bottom layer of a left handed super-wide-angle CLC based broadband circular analyzer 10 which receives the light transmitted from the polarizer 40 as left handed and reflects it back through polarizer 40. Since all the light is reflected, the window is in the dark or off configuration. It is clear that top polarizer 40 can be combined with polarizer 50 instead of 10, and that bottom analyzer 10 can be combined with top polarizer 50 instead of 40. In addition, a combination of top polarizer 50 and bottom polarizer 50 will achieve the same effect.

FIG. 17 shows the smart window of FIG. 16 with a $\pi$ phase shifter 65 inserted between films 10 and 40. This time the handedness of the films 10 and 40 are reversed to show that the device works either way. When unpolarized light 20 is incident on polarizer 40, half of the light is reflected as 22 and the remaining half is transmitted as right handed light. If the $\pi$ phase shifter 65 is on and changes the light to left handed, the light is transmitted thought film 10 and exits the smart window having been transmitted therethrough. If the $\pi$ phase shifter is off and does not change the light transmitted through polarizer 40, the light is reflected by film 10 as before in FIG. 16. Thus the smart window can be in the off mode and reflect all light or be in the on mode and transmit half of the incident light. It is to be understood that polarizers 40 and 10 can be substituted and combined with polarizer 50 as was previously explained.

Figure 18:
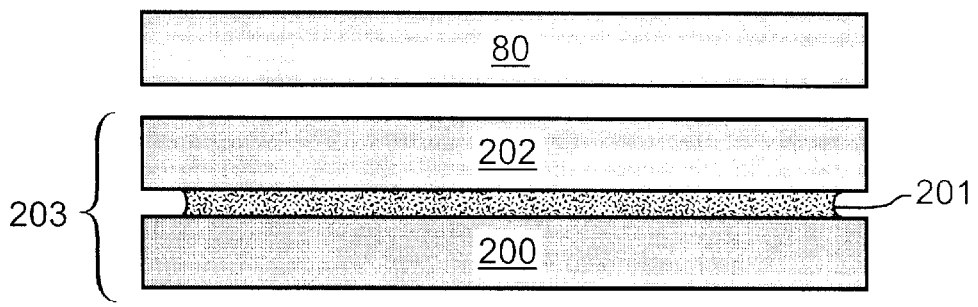
FIG. 18 is a schematic of a smart window with an infrared coating incorporating the passive smart window of FIG. 16.

When smart windows operate in the infrared region, heat may be reflected or transmitted by the window helping to cool or heat a structure. FIG. 18 shows a smart switchable window 203 having a glass substrate 200, a polymer stabilized cholesteric texture layer 201, and a glass substrate 202. The addition of a passive IR smart window 80 of FIG. 16 allows visible light to be transmitted through the smart window 203 without color distortion at large angles of viewing, and at the same time to provide for energy conservation. Optionally, a switchable IR smart window 81 of FIG. 17 can be incorporated instead of 80.

The film layers shown in FIGS. 2, 6, 7, and 8, once formed together, can be crushed into small fragments to be used as pigments in paints and inks, or applied to objects by spraying, painting, or other means of depositing with adhesive materials. In this manner the super-wide-angle CLC-based broadband polarizers and analyzers 10, 40, and 50 can be easily applied to a wide range of uses such as windows.

Figure 19:
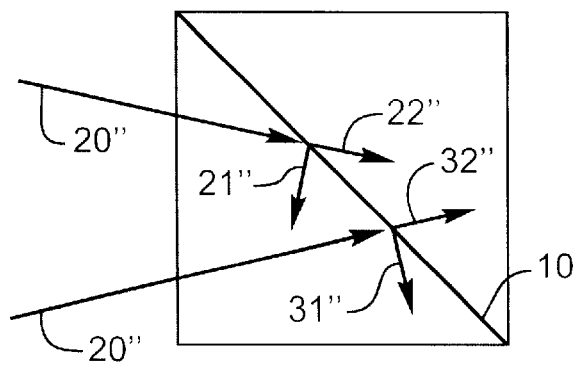
FIG. 19 is a schematic of a beam splitter using the polarizer of the present invention.

FIG. 19 is a schematic of a beam splitter using the polarizer of the present invention. The characteristics of the reflection and transmission at various angles is similar to that described with respect to FIGS. 1, 3A–3H, 4A–4D and 5A05E. Two unpolarized beams 20" approach a CLC based reflective broadband polarizing film 10. The beam 20" on the top is at a low angle of incidence and the beam 20" on the bottom is at a high angle of incidence. For normal incidence and low angle of incidence light, circularly polarized light 22" of an opposite handedness as the CLC based reflective broadband polarizing film 10 is transmitted through the CLC based reflective broadband polarizing film 10, and polarized light 21" of the same handedness as the CLC based reflective broadband polarizing film 10 is reflected from the CLC based reflective broadband polarizing film 10. For larger angles of incidence light, a mixture of circularly polarized light 32"(i.e., left and right handed) is transmitted through the CLC based reflective broadband polarizing film 10, and a mixture of circularly polarized light 31"(i.e., left and right handed) is reflected from the CLC based reflective broadband polarizing film 10.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying claims to Invention.

What is claimed is:

1. A wide incident angle broadband polarizer comprising:
    a broadband polarizing film having a cholesteric order, said polarizing film including a varying helical pitch distribution, said broadband polarizing film having a reflection band;
    a first compensating film having a cholesteric order, said first compensating film including a constant helical pitch distribution; said first compensating film having a reflection band in the infrared portion of the electromagnetic spectrum; and
    a second compensating film having a homeotropic order;
    a third compensating film having a cholesteric order, said third compensating film including a constant helical pitch distribution; said third compensating film having a reflection band in the infrared spectrum; and
    a fourth compensating film having a homeotropic order;
        wherein said first compensating film is interposed between said broadband polarizing film and said second compensating film
        wherein said broadband polarizing film is interposed between said first compensating film and said third compensating film, and
        wherein said third compensating film is interposed between said broadband polarizing film and said fourth compensating film.

2. The wide incident angle broadband polarizer of claim 1, further comprising:
    an other broadband polarizing film having a cholesteric order, said other broadband polarizing film including a varying helical pitch distribution;
    wherein said other broadband polarizing film is interposed between said first compensating film and broadband polarizing film.

3. The wide incident angle broadband polarizer of claim 2, wherein
    said broadband polarizing film has a first side and a second side, the pitch of said first side being greater than the pitch of said second side;
    said other broadband polarizing film has a first side and second side, the pitch of said first side being greater than the pitch of said second side; and
    said second side of said broadband polarizing film is adjacent to said second side of said other broadband polarizing film.

4. The wide incident angle broadband polarizer of claim 3, wherein said broadband polarizing film reflects light having an orthogonal polarization state to that of said other broadband polarizing film, wherein said wide incident angle broadband polarizer reflects substantially all incident light.

5. A smart window comprising the wide incident angle broadband polarizer of claim 1, further comprising an electrically actuatable pi phase shifter interposed between said broadband polarizing film and said other broadband polarizing film.

6. A polarizing beamsplitter comprising:

the wide incident angle broadband polarizer of claim 1.

7. The polarizing beamsplitter of claim 6 wherein said wide incident angle broadband polarizer is disposed on a substrate.

8. The polarizing beamsplitter of claim 6 wherein said wide incident angle broadband polarizer is disposed in a block of transparent material, said wide incident angle broadband polarizer being oriented diagonally in said block.

9. A polarizing device comprising:

a first polarizing beamsplitter of claim 8;

a second polarizing beamsplitter of claim 8;

wherein said wide incident angle broadband polarizer of said first polarizing beamsplitter reflects light having an orthogonal polarization state to that of said wide incident angle broadband polarizer of said second polarizing beamsplitter; and wherein said first polarizing beamsplitter is adjacent to said second polarizing beamsplitter.

10. The polarizing device of claim 9 further comprising a mirror adjacent to either said first polarizing beamsplitter or said second polarizing beamsplitter.

11. A polarizing light source comprising:

an unpolarized light source interposed between a mirror and the wide incident angle broadband polarizer of claim 1;

said polarized light source emitting substantially circularly polarized light.

12. The polarized light source of claim 11 further comprising a quarter wave retarder adjacent to said wide incident angle broadband polarizer;

said polarizing light source emitting substantially linearly polarized light.

13. A liquid crystal display comprising the wide incident angle broadband polarizer of claim 1.

14. A smart window comprising the wide incident angle broadband polarizer of claim 1.

15. A pigment comprising flakes of the wide incident angle broadband polarizer of claim 1.

* * * * *